(12) United States Patent
Williams

(10) Patent No.: US 8,286,820 B2
(45) Date of Patent: Oct. 16, 2012

(54) PROTECTIVE DEVICE

(75) Inventor: Ian Trevor Williams, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 923 days.

(21) Appl. No.: 12/374,501

(22) PCT Filed: May 21, 2007

(86) PCT No.: PCT/EP2007/054895
§ 371 (c)(1),
(2), (4) Date: Feb. 6, 2009

(87) PCT Pub. No.: WO2008/009498
PCT Pub. Date: Jan. 24, 2008

(65) Prior Publication Data
US 2009/0313910 A1 Dec. 24, 2009

(30) Foreign Application Priority Data
Jul. 19, 2006 (DE) .......................... 10 2006 033 462

(51) Int. Cl.
*B65D 51/16* (2006.01)
(52) U.S. Cl. ...................... 220/367.1; 220/786; 220/601; 220/373
(58) Field of Classification Search .................. 206/784, 206/786, 787, 789, 800, 801, 601, 565, 724, 206/374, 373, 367.1, 366.1; 217/98, 113, 217/106; 220/784, 786, 787, 789, 800, 801, 220/601, 565, 724, 374, 373, 367.1, 366.1
See application file for complete search history.

(56) References Cited

U.S. PATENT DOCUMENTS

| 1,696,240 | A | * | 12/1928 | Kircher, Jr. .................... 220/797 |
| 2,024,511 | A | * | 12/1935 | Darling ..................... 220/203.09 |
| 3,935,969 | A | * | 2/1976 | Birkeland et al. .......... 222/541.1 |
| 4,741,452 | A | * | 5/1988 | Holzkopf ....................... 220/783 |
| 5,967,363 | A | * | 10/1999 | Allen ............................. 220/806 |
| 6,250,494 | B1 | * | 6/2001 | Diamond ....................... 220/783 |
| 6,688,487 | B2 | * | 2/2004 | Oakes et al. .................. 220/788 |

FOREIGN PATENT DOCUMENTS

| DE | 20 2005 001 931 U1 | 4/2005 |
| EP | 0 153 428 A1 | 9/1985 |
| GB | 1 348 983 | 3/1974 |
| WO | 02/44594 A1 | 6/2002 |

* cited by examiner

*Primary Examiner* — David T. Fidei
*Assistant Examiner* — Raven Collins
(74) *Attorney, Agent, or Firm* — Laurence A. Greenberg; Werner H. Stemer; Ralph E. Locher

(57) ABSTRACT

A protective device for a wall region to be protected, includes a collar which has recesses penetrating the collar and is disposed around the wall region to be protected in an intended configuration of the protective device. A protective cap includes a base and a casing, which extends from the base substantially perpendicularly up to a casing edge and has recesses penetrating the casing. The casing recesses extend from the casing edge in the direction of the base of the protective cap. Casing sections are formed between the recesses. In the intended configuration of the protective device, the casing is disposed between the collar and the wall region to be protected, and one of the casing sections is disposed between each collar recess and the wall region to be protected so that a free linear connection is prevented between the respective collar recess and the wall region to be protected.

8 Claims, 3 Drawing Sheets

FIG. 3   III-III'

FIG. 4
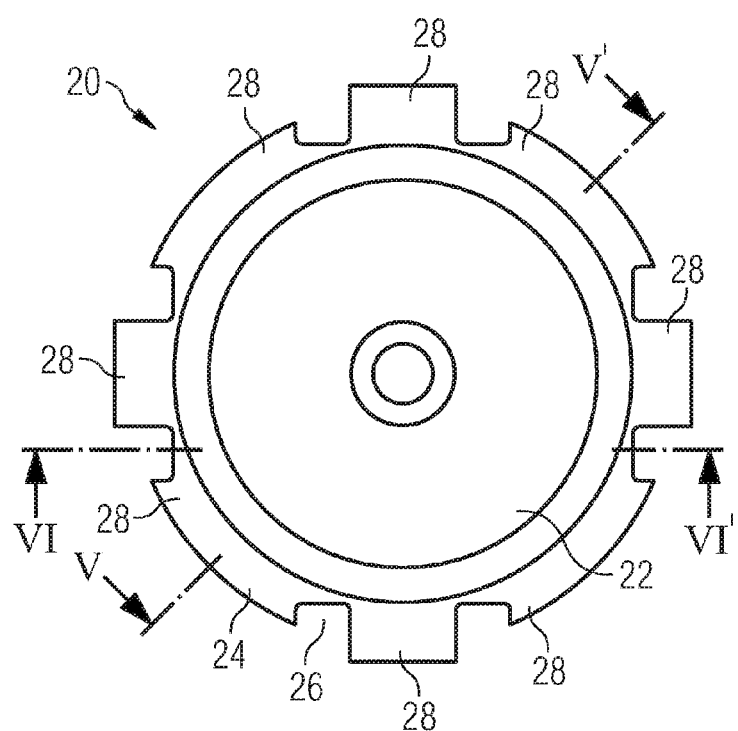
FIG. 5 V-V'
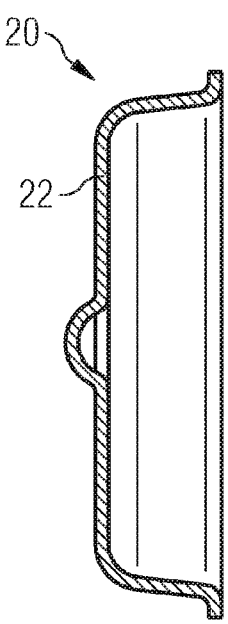
FIG. 6 VI-VI'
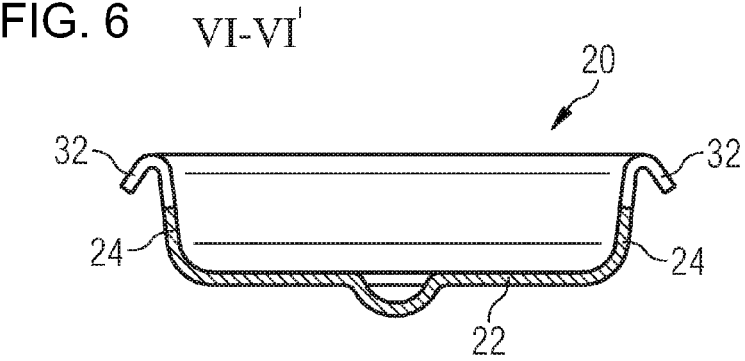

PROTECTIVE DEVICE

BACKGROUND OF THE INVENTION

Field of the Invention

The invention relates to a protective device for a wall region to be protected.

In the case of exposed wall regions, it may be necessary to equip them with a protective device in order thereby to prevent or limit the effect of external influences on the exposed wall regions.

BRIEF SUMMARY OF THE INVENTION

The object of the invention is to create a protective device for a wall region to be protected, with the aid of which effective protection can be achieved for the wall region to be protected in a simple and reliable manner.

The object is achieved by the features of the invention described below.

According to a first aspect, the invention is distinguished by a protective device for a wall region to be protected, having a collar with collar apertures penetrating the collar, which is disposed around the wall region to be protected in the arrangement of the protective device as intended, and a protective cap having a base and a casing, which extends from the base essentially perpendicularly up to a casing edge and which has casing apertures penetrating the casing, the casing apertures extending from the casing edge in the direction of the base of the protective cap and being formed between the casing segment. Given the arrangement of the device as intended, the casing is disposed between the collar and the wall region to be protected, and one of the casing segments is disposed between each of the collar apertures and the wall region to be protected such that a free linear connection is prevented between the respective collar aperture and the wall region to be protected.

This has the advantage that a liquid which advances to the protective device from outside the protective device, for example in the case of spraying of the liquid, does not advance to the wall region to be protected on a direct linear path but instead can be prevented from pushing forward to the wall region to be protected by using the protective device. Thus, wall regions that no liquid is supposed to advance to can be protected against exposure to liquid.

In a particularly preferred embodiment of the invention, at least one of the casing apertures and at least one of the collar apertures are formed and disposed such that a liquid can be discharged from the wall region to be protected to one of the collar apertures. Thus, a liquid that is situated in a region of the wall region to be protected or its immediate surroundings can be discharged to the outside via at least one of the casing apertures and at least one of the collar apertures and thus a lengthy dwell time of the liquid on the wall region to be protected can be prevented.

In a further particularly preferred embodiment of the invention, the collar is formed with an annular shape and the collar apertures have spacings that are essentially identical to each other. This has the advantage that a liquid can be discharged effectively from out of the protective device via at least one of the collar apertures.

In a further advantageous embodiment of the invention, the casing of the protective cap is formed with an annular shape and the casing apertures have spacings that are essentially identical to each other. Therefore a liquid can be discharged effectively from an inner region of the protective device via at least one of the casing apertures.

In a further particularly preferred embodiment of the invention, the collar has four collar apertures and the casing of the protective cap eight casing apertures. A very effective discharge of liquid is thus possible via the protective device. In this respect, the direct penetration of liquid into the inner region of the protective cap can nevertheless be prevented.

In a further particularly preferred embodiment of the invention, the protective cap has tabs which are disposed and formed such that they extend from the casing edge to the collar and the protective cap can be coupled to the collar. A simple coupling of the protective cap to the collar is thus possible.

In a further particularly preferred embodiment of the invention, casing apertures are disposed adjacent to the tabs. Good movement of the tabs is therefore possible.

According to a second aspect, the invention is distinguished by an arrangement with a housing wall having a wall region to be protected, and a protective device.

BRIEF DESCRIPTION OF THE SEVERAL VIEWS OF THE DRAWING

In the following, an advantageous embodiment of the invention is explained in detail on the basis of the schematic drawings.

These show.

DESCRIPTION OF THE INVENTION

Figure 1:
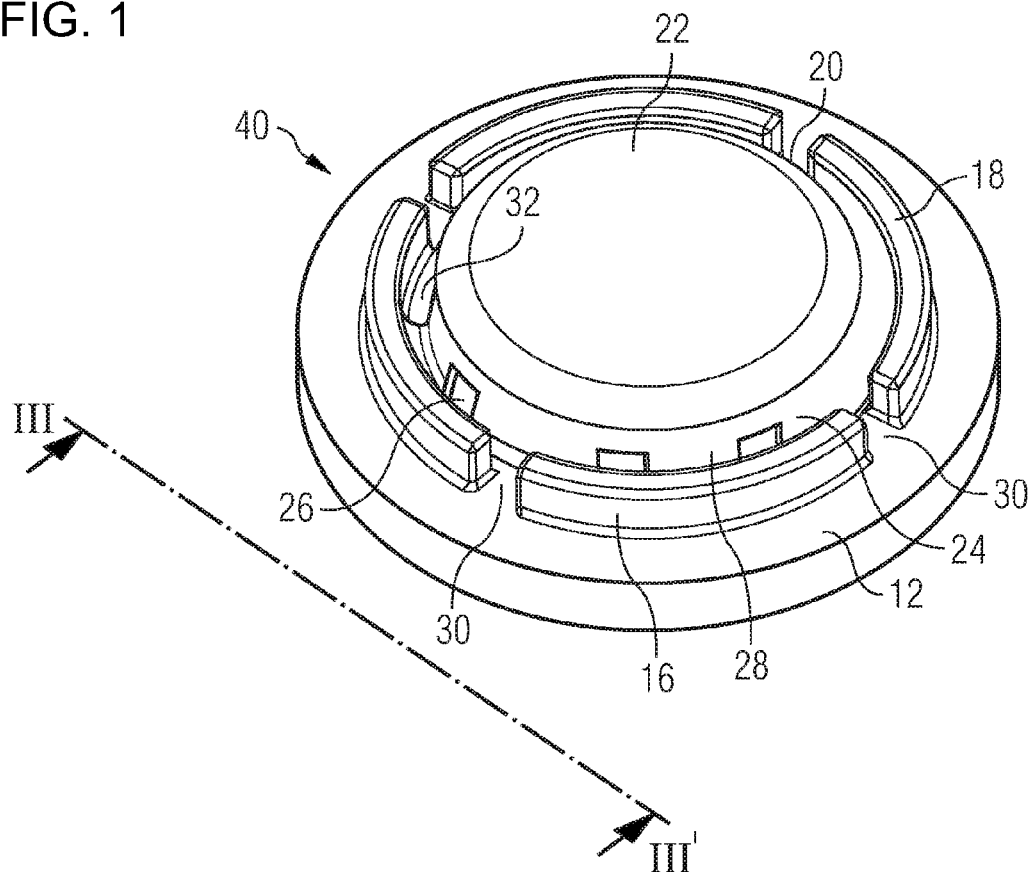
FIG. 1 A perspective view of an arrangement with a housing wall and a protective device, FIG. 2 A longitudinal section of the arrangement with a housing wall and a protective device, FIG. 3 A cross-section through the arrangement with a housing wall and a protective device along the line III-III' in FIG. 1, FIG. 4 A plan view of a protective cap of the protective device, FIG. 5 A cross-section through the protective cap along the line V-V' in FIG. 4, and FIG. 6 A further longitudinal section through the protective cap along the line VI-VI' in FIG. 4.
Figure 2:
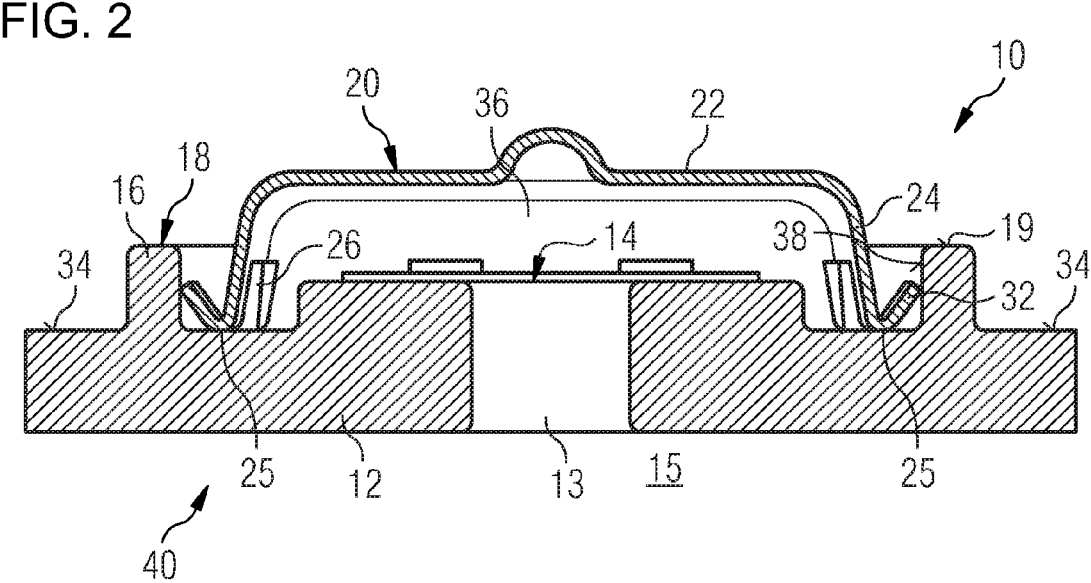

Elements with the same design or function are identified with the same reference symbols across all the figures.

An arrangement 40 comprises a housing wall 12 with a wall region 14 to be protected and a protective device 10 for the wall region 14 to be protected.

The housing wall 12 comprises, in the embodiment represented here, an opening 13. Through the opening 13, a gas is preferably fed into an internal space 15, delimited by the housing wall 12, of a housing not shown here, or discharged from same. The opening 13 is covered by the wall region 14 to be protected of the housing wall 12. The wall region 14 to be protected of the housing wall 12 can preferably be a membrane that allows the passage of gases whereas it can prevent the passage of liquids. A membrane of this type can preferably have PTFE (polytetrafluoroethylene), since PTFE allows the passage of gases while it can prevent the passage of liquids.

The protective device 10 has a collar 16, which is formed in a single piece with the housing wall 12 in the embodiment represented here. It is particularly preferred if the collar 16 is embodied as a pressure die-cast part. The collar 16 can also form its own component and be coupled to the housing wall 12 by means of a known coupling method (preferably welding, soldering, adhesive bonding). The collar 16 has a plurality of collar apertures 30 which penetrate the collar 16. In the embodiment represented here, the collar apertures 30 are embodied such that they reach from one collar edge 18, which is formed on a side 19 that faces away from the housing wall 12, of the collar 16, to an outer side 34 of the housing wall 12. It is also possible, however, for the collar aperture 30 to start from the outer side 34 of the housing wall 12 but not reach as far as the collar edge 18, i.e. be formed as a tunnel-shaped hole through the collar 16.

Disposed between the collar 16 and the wall region 14 to be protected is a protective cap 20 with a base 22 and a casing 24. The casing 24 extends from the base 22 essentially perpendicularly up to a casing edge 25. The casing edge 25 lies against the outer side 34 of the housing wall 12. From the casing edge 25, casing apertures 26, which penetrate the casing 24, extend in the direction of the base 22 of the protective cap 20. It is preferred if the protective cap 20 consists of a metal, particularly a type of steel.

Figure 3:
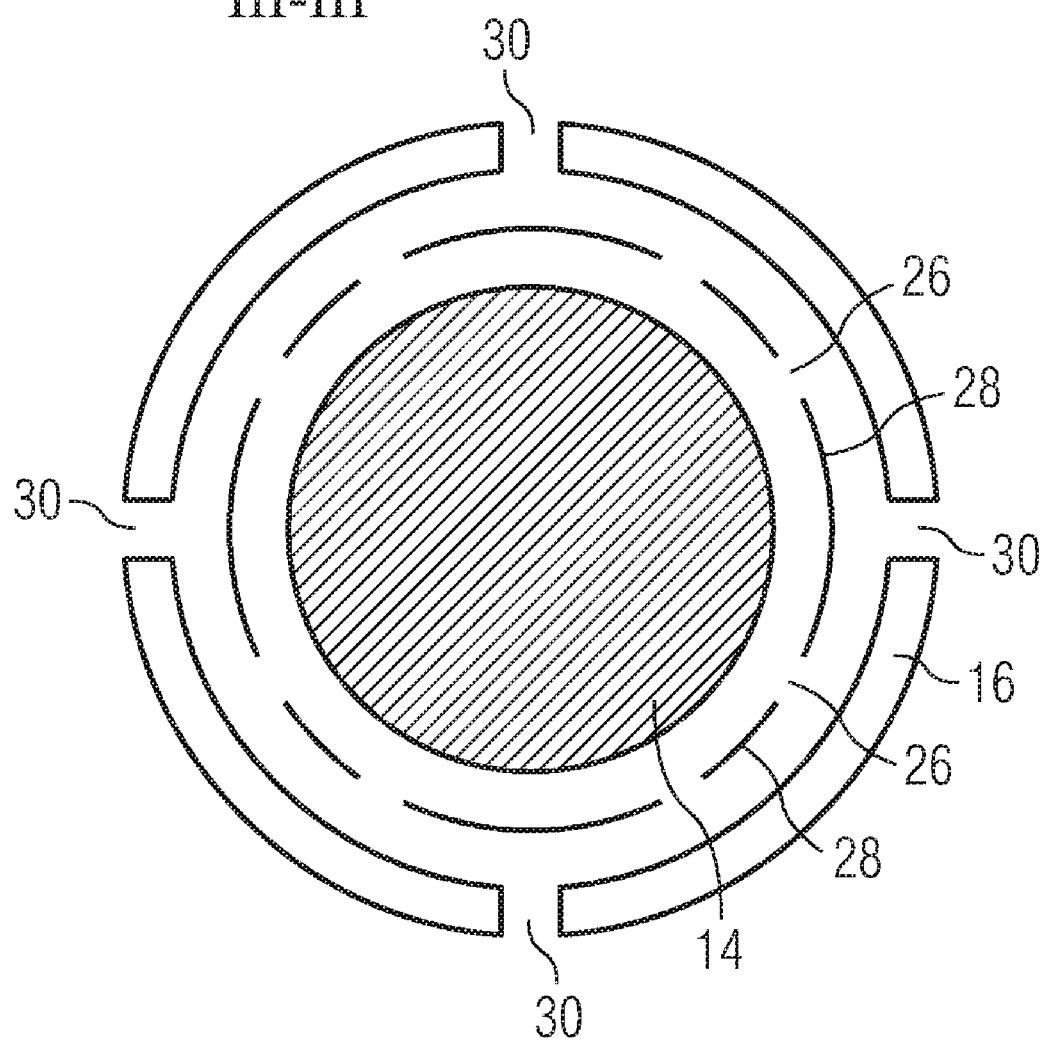

In the casing 24, casing segments 28 are formed between the casing apertures 26. As can be seen particularly well in FIG. 3, the casing apertures 26 are disposed such that the casing segments 28 lying between them prevent a direct linear connection from a casing aperture 30 to the wall region 14 to be protected. It is therefore possible to prevent a jet of liquid, which penetrates through one of the collar apertures 30 into the protective device 10, advancing by a direct path via one of the casing apertures 26 to the wall region 14 to be protected. A jet of liquid can consequently always be fed by means of the arrangement of the casing segments 28 and the collar apertures 30 such that it can only advance to regions of the housing wall 12 outside the wall region 14 to be protected.

If a liquid should have advanced to the wall region 14 to be protected, the arrangement of the casing apertures 26 and the collar apertures 30 enables this liquid to advance from the wall region 14 to be protected via one of the casing apertures 26 to one of the collar apertures 30. It is therefore possible to discharge a liquid to the outside from out of the protective device 10. This is additionally supported by the fact that the casing 24 of the protective cap 20 is formed with an annular shape and the casing apertures 26 have spacings that are essentially identical to each other. It is therefore possible for a liquid to be discharged effectively from out of the protective cap 20 via at least one of the casing apertures 26. Furthermore, the collar 16 is formed with an annular shape and the collar apertures 30 have spacings that are essentially identical to each other. It is thus possible for a liquid to be discharged effectively from out of the protective device 10 via at least one of the collar apertures 30.

In the embodiment represented here, the collar 16 has four collar apertures 30, which are disposed about the periphery of the annular collar 16 with a spacing of 90° in each case. The casing 24 of the protective cap 20 has eight casing apertures 26, which are disposed point-symmetrically in the casing 24. On the one hand, the quantity and arrangement of the collar apertures 30 and the casing apertures 26 enable a very effective discharge of liquid from the interior of the protective device 10. On the other hand, however, the arrangement of the collar apertures 30 and the casing apertures 26 can effectively prevent a liquid advancing from outside the protective device 10 directly to the wall region 14 to be protected, since no direct linear connection is possible between the collar apertures 30 and the wall region 14 to be protected due to the casing segments 28 disposed between the casing apertures 26.

The protective cap 20 has tabs 32 which extend from the casing segments 28 from the casing edge 25 in the direction of the collar 16. In this respect, the tabs 32 are disposed such that they engage in the collar 16 on an inner side 38 of the collar 16, facing the casing 24, with the result that the protective cap 20 can be coupled to the collar 16. It is particularly preferred if the tabs 32 are bent with respect to the casing 24 of the protective cap 20 such that the tabs 32 take up an angle of 50° to 60° with the outer side 34 of the housing wall 12. In this case, the protective cap 20 can firstly be introduced into the collar 16 easily and secondly an effective mounting of the protective cap 20 on the inner side 38 of the collar 16 is achieved.

If, as in the embodiment represented here, casing apertures 26 are disposed directly adjacent to the tabs 32, then the tabs 32 have a particularly high level of flexibility, with the result that the insertion of the protective cap 20 into the collar 16 can be made easier.

The mode of operation of the protective device 10 is to be briefly described in the following.

A jet of liquid that is directed from outside onto the protective device 10 can advance to a region between the collar 16 and the casing 24 of the protective cap 20 through one of the collar apertures 30. However, the arrangement of the casing segments 28 between the collar apertures 30 and the wall region 14 to be protected makes it possible to prevent the jet of liquid advancing to the wall region 14 to be protected by a direct path from one of the collar apertures 30.

If a liquid has advanced to an inner region 36 of the protective cap 20, then it can escape to the collar 16 via one or more of the casing apertures 26. The liquid can then continue to flow in the direction of one of the collar apertures 30 and at that point escape from the protective device 10. It is thus possible to protect the wall region 14 to be protected from direct exposure to a liquid and on the other hand to remove liquid that has penetrated into the inner region 36 of the protective cap 20 from the protective device 10 again in a simple manner. In this respect, an exchange of gas between the inner space 15 of the housing, delimited by the housing wall 12, and the region outside the protective device 10 remains possible via the opening 13 and the wall region 14 to be protected, which is formed in particular as a membrane.

The invention claimed is:

1. A protective device for protecting a wall region of a wall, the protective device comprising:
    a collar disposed at the wall and around the wall region to be protected in an intended configuration of the protective device, said collar having collar apertures penetrating said collar; and
    a protective cap having a base and a casing with a casing edge, said casing extending from said base substantially perpendicularly up to said casing edge, and said casing having casing apertures penetrating said casing, said casing apertures extending from said casing edge in a direction towards said base of said protective cap and defining casing segments between said casing apertures;
    said casing being disposed between said collar and the wall region to be protected, and a respective one of said casing segments being disposed between each respective collar aperture and the wall region to be protected, preventing a free linear connection between said respective collar aperture and the wall region to be protected, in said intended configuration of the protective device.

2. The protective device according to claim 1, wherein at least one of said casing apertures and at least one of said collar apertures are configured and disposed to permit a liquid to be discharged from the wall region to be protected to one of said collar apertures.

3. The protective device according to claim 1, wherein said collar has an annular shape and said collar apertures are mutually spaced apart by substantially identical distances.

4. The protective device according to claim 1, wherein said casing of said protective cap has an annular shape and said casing apertures are mutually spaced apart by substantially identical distances.

5. The protective device according to claim 1, wherein said collar has four of said collar apertures, said casing of said protective cap has eight of said casing apertures, said collar has an annular shape and said collar apertures are mutually spaced apart by substantially identical distances, and said casing of said protective cap has an annular shape and said casing apertures are mutually spaced apart by substantially identical distances.

6. The protective device according to claim 1, wherein said protective cap has tabs configured and disposed to extend from said casing edge to said collar for coupling said protective cap to said collar.

7. The protective device according to claim 6, wherein said casing apertures are adjacent said tabs.

8. A configuration, comprising:

a housing wall having a wall region to be protected; and a protective device according to claim 1.

\* \* \* \* \*